US010768283B2

United States Patent
Hansen et al.

(10) Patent No.: US 10,768,283 B2
(45) Date of Patent: Sep. 8, 2020

(54) ENHANCED DISTANCE DATA ACQUISITION (71) Applicant: ams Sensors Singapore Pte. Ltd., Singapore (SG)

(72) Inventors: Bryant Hansen, Zurich (CH); Cassian Strässle, Wädenswil (CH); Miguel Bruno Vaello Paños, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 258 days.

(21) Appl. No.: 15/774,762

(22) PCT Filed: Nov. 10, 2016

(86) PCT No.: PCT/SG2016/050558
§ 371 (c)(1),
(2) Date: May 9, 2018

(87) PCT Pub. No.: WO2017/082826
PCT Pub. Date: May 18, 2017

(65) Prior Publication Data
US 2018/0329043 A1    Nov. 15, 2018

Related U.S. Application Data

(60) Provisional application No. 62/253,778, filed on Nov. 11, 2015.

(51) Int. Cl.
*G01S 7/4912* (2020.01)
*G01S 17/89* (2020.01)
(Continued)

(52) U.S. Cl.
CPC ............ *G01S 7/4918* (2013.01); *G01B 11/24* (2013.01); *G01B 21/045* (2013.01);
(Continued)

(58) Field of Classification Search
CPC ...... G01S 7/4918; G01S 7/4808; G01S 7/497; G01S 17/36; G01S 17/89; G01B 11/24; G01B 21/045
See application file for complete search history.

(56) References Cited

U.S. PATENT DOCUMENTS

2010/0328488 A1    12/2010  Bamidele et al.
2014/0132721 A1    5/2014   Martinez Bauza et al.
2018/0227475 A1*   8/2018   Kishimoto ............. G06T 7/514

OTHER PUBLICATIONS

ISA/AU, International Search Report for PCT/SG2016/050558 (dated Mar. 1, 2017).

* cited by examiner

*Primary Examiner* — Eric L Bolda
(74) *Attorney, Agent, or Firm* — Michael Best and Friedrich LLP (57) ABSTRACT

A distance acquisition method comprising: initializing an optical ranging system, the optical ranging system including a plurality of pixels operable to covert incident light to electrical charges; collecting electrical charges with the plurality of exposed pixels over an integration time, each pixel collecting electrical charges with an amplification and a sensitivity; correlating the electrical charges collected in each pixel to an exposure value for each pixel, the exposure value corresponding to being adequately exposed, over-exposed, or under-exposed; identifying each exposure value for each pixel as being either valid or invalid, wherein a valid exposure value corresponds to an adequately exposed pixel and an invalid exposure value corresponds to an over-exposed or under-exposed pixel; totalling the number of valid exposure value pixels; totalling the number invalid exposure value pixels; determining an exposure ratio, the ratio being the number of pixels with valid exposure values divided by the number of pixels with invalid exposure values; totalling the number of over-exposed pixels; total-
(Continued)

ling the number of under-exposed pixels; determining an invalid exposure ratio, the invalid exposure ratio being the number of over-exposed pixels divided by the number of under-exposed pixels; and determining an average valid exposure value, the average valid exposure value being the average of the valid exposure values. The method additionally comprises: using the exposure ratio, the invalid exposure ratio and the average valid exposure to optimise the integration time; using the exposure value for each pixel to optimise the amplification and sensitivity for each pixel; and determining distance data from electrical charges collected from at least one of the plurality of pixels.

19 Claims, 5 Drawing Sheets (51) Int. Cl.
*G01S 7/497* (2006.01)
*G01S 7/48* (2006.01)
*G01B 21/04* (2006.01)
*G01B 11/24* (2006.01)
*G01S 17/36* (2006.01)

(52) U.S. Cl.
CPC ............ *G01S 7/4808* (2013.01); *G01S 7/497* (2013.01); *G01S 17/36* (2013.01); *G01S 17/89* (2013.01)

ENHANCED DISTANCE DATA ACQUISITION

FIELD OF THE DISCLOSURE

The present disclosure relates to methods for generating distance data with optical ranging systems.

BACKGROUND

Optical ranging systems can collect distance data of one or more objects in a scene. Distance data can include, for example, the distance between the one or more objects and the optical ranging system. Optical ranging systems typically contain an illumination source and a plurality of pixels. The pixels can be operable to collect incident light and can generate distance data. The pixels can be, for example, time-of-flight pixels. Generally, the pixels, including associated circuity, can collect incident light and generate electrical charge carriers over a particular integration time, with a particular sensitivity, and with a particular amplification.

Optical ranging systems with such pixels typically direct light from the illumination source onto the object(s) in the scene. Some of this light reflects from the object(s) and is directed to the plurality of pixels. Only a portion of this light, however, is incident on the pixels. Further, that portion may vary from object to object as the portion of light reflected and incident on the pixels is dependent on the reflectivity and distance of the object(s) from the optical ranging system. For example, objects that are closer to the optical ranging system can reflect more light back to the plurality of pixels than objects that are further away.

In order to generate distance data, the pixels must capture incident light reflected from the object(s), the light generates charge carriers, and the charge carriers are converted into a signal that is subsequently correlated with distance data of the object(s). In some instances, the pixels may not capture enough light to generate sufficient charge carriers to generate accurate distance data; that is, the signal-to-noise ratio may be too low to be useful. In such instances, the pixels are under-exposed. In other instances, the pixels may capture too much light, thereby generating too many charge carriers that subsequently saturate the pixel. In such instances, the pixels are over-exposed and the signal is not capable of generating accurate distance data. Between these two extremes, however, the pixels may capture sufficient light to generate accurate distance data; that is, the signal-to-noise ratio may be high enough to produce accurate distance data. In such instances, the pixels are adequately exposed.

The dynamic range of incident light required to generate adequately exposed pixels is customizable since the amount of light reflected from the object(s) and incident on the pixels can vary significantly. Consequently, various techniques have been developed to alter the dynamic range of the pixels. In some instances, for example, the integration time can be dependent on the intensity of light incident on the pixels, and can be increased to collect more light and generate more charge carriers, or decreased to collect less light and generate fewer charge carriers. Similarly, in some instances, pixel sensitivity can be altered. For example, in some time-of-flight pixels, the sensitive area of each pixel can be increased to collect more light and generate more charge carriers, or decreased to collect less light and generate fewer charge carriers. While effective, altering integration time, sensitivity, and/or amplification can consume significant resources. It can be particularly time consuming, for example, and therefore is a challenge to implement in optical ranging systems used in real-time or near real-time applications.

SUMMARY

The present disclosure describes methods for rapidly generating distance data with optical ranging systems. For example, in one aspect, a method includes initializing an optical ranging system that includes a plurality of pixels operable to covert incident light to electrical charges. The method further includes directing incident light to the plurality of pixels, and collecting electrical charges with the plurality of pixels over an integration time. Each of the pixels collects electrical charges with an amplification and a sensitivity. The method further includes correlating the electrical charges collected in each pixel to an exposure value for each pixel. The exposure value corresponds to an adequately exposed pixel, an over-exposed pixel, or an under-exposed pixel. The method further includes identifying each exposure value for each pixel as being a valid exposure value or an invalid exposure value. A valid exposure value corresponds to an adequately exposed pixel and an invalid exposure value corresponds to an over-exposed pixel or an under-exposed pixel. The method can further include: totaling the number of pixels with valid exposure values, totaling the number of pixels with invalid exposure values, and determining an exposure ratio. The exposure ratio is the number of pixels with valid exposure values divided by the number of pixels with invalid exposure values. The method further can include totaling the number of over-exposed pixels, totaling the number of under-exposed pixels, and determining an invalid exposure ratio. The invalid exposure ratio is the number of over-exposed pixels divided by the number of under-exposed pixels. The method further can include determining an average valid exposure value. The average valid exposure value is the average of the valid exposure values.

The method can further include, in some implementations, increasing the integration time when the invalid exposure ratio is less than a validity threshold value and an exposure threshold value, or decreasing the integration time when the invalid exposure ratio is less than the validity threshold value and greater than or equal to the exposure threshold value.

The method can further include, in some implementations, determining an average valid exposure value when the exposure ratio is greater than or equal to a validity threshold value, correlating the average valid exposure value to a scaling factor, and altering the integration time with the scaling factor.

The method can further include, in some implementations: directing incident light to the pixels, and collecting electrical charges with the pixels over the integration time. These implementations can further include correlating the electrical charges collected in each pixel to the exposure value for each pixel. The exposure value corresponds to an adequately exposed pixel, an over-exposed pixel, or an under-exposed pixel. These implementations can further include increasing the amplification for each under-exposed pixel and decreasing the amplification for each over-exposed pixel.

The method can further include, in some implementations, directing incident light to the plurality of pixels, and collecting electrical charges with the plurality of pixels over the integration time. These implementations further include increasing the sensitivity for each under-exposed pixel and decreasing the sensitivity for each over-exposed pixel.

The method can further include, in some implementations, directing incident light to the plurality of pixels, and collecting electrical charges with the plurality of pixels over the integration time. These implementations further include determining distance data from electrical charges collected from at least one of the plurality of pixels.

The method can further include, in some implementations, directing incident light to the plurality of pixels, and collecting electrical charges with the plurality of pixels over the integration time. These implementations further include determining distance data from electrical charges collected from at least one of the plurality of pixels.

The method can further include, in some implementations, increasing the sensitivity for each under-exposed pixel and decreasing the sensitivity for each over-exposed pixel, and determining distance data from electrical charges collected from at least one of the plurality of pixels.

The method can further include, in some implementations, increasing the amplification for each under-exposed pixel and decreasing the amplification for each over-exposed pixel. These implementations further include totaling the number of pixels with valid exposure values, totaling the number of pixels with invalid exposure values, totaling the number of over-exposed pixels, totaling the number of under-exposed pixels, and determining the invalid exposure ratio when the exposure ratio is less than a second validity threshold value.

The method can further include, in some implementations, increasing the integration time when the invalid exposure ratio is less than a second exposure threshold value, or decreasing the integration time when the invalid exposure ratio is greater than or equal to a second exposure threshold value.

The method can further include, in some implementations, determining an average valid exposure value when the exposure ratio is greater than or equal to the second validity threshold value. These implementations can further include correlating the average valid exposure value to a scaling factor, and altering the integration time with the scaling factor.

The method can further include, in some implementations, directing incident light to the plurality of pixels, collecting electrical charges with the plurality of pixels over the integration time, increasing the amplification for each under-exposed pixel, decreasing the amplification for each over-exposed pixel, increasing the sensitivity for each under-exposed pixel, decreasing the sensitivity for each over-exposed pixel, and determining distance data from electrical charges collected from at least one of the plurality of pixels.

The method can further include, in some implementations, directing incident light to the plurality of pixels, collecting electrical charges with the plurality of pixels over the integration time, increasing the amplification for each under-exposed pixel, decreasing the amplification for each over-exposed pixel, increasing the sensitivity for each under-exposed pixel, decreasing the sensitivity for each over-exposed pixel, and determining distance data from electrical charges collected from at least one of the plurality of pixels.

The method can further include, in some implementations, directing incident light to the plurality of pixels, collecting electrical charges with the plurality of pixels over the integration time, increasing the amplification for each under-exposed pixel, decreasing the amplification for each over-exposed pixel, increasing the sensitivity for each under-exposed pixel, decreasing the sensitivity for each over-exposed pixel, and determining distance data from electrical charges collected from at least one of the plurality of pixels.

The method can further include, in some implementations, determining the invalid exposure ratio when the exposure ratio is less than a second validity threshold value.

The method can further include, in some implementations, increasing the integration time when the invalid exposure ratio is less than a second exposure threshold value, or decreasing the integration time when the invalid exposure ratio is greater than or equal to a second exposure threshold value. These implementations can further include directing incident light to the plurality of pixels, collecting electrical charges with the plurality of pixels over the integration time, increasing the amplification for each under-exposed pixel, decreasing the amplification for each over-exposed pixel, increasing the sensitivity for each under-exposed pixel, and decreasing the sensitivity for each over-exposed pixel, and determining distance data from electrical charges collected from at least one of the plurality of pixels.

The method can further include, in some implementations, determining an average valid exposure value when the exposure ratio is greater than or equal to the second validity threshold value, correlating the average valid exposure value to a scaling factor, and altering the integration time with the scaling factor. These implementations can further include directing incident light to the plurality of pixels, collecting electrical charges with the plurality of pixels over the integration time, increasing the amplification for each under-exposed pixel, decreasing the amplification for each over-exposed pixel, increasing the sensitivity for each under-exposed pixel, and decreasing the sensitivity for each over-exposed pixel, and determining distance data from electrical charges collected from at least one of the plurality of pixels.

Various implementations provide one or more of the following advantages. For example, some of the implementations can provide for highly accurate distance data. Further, some of the implementations can rapidly provide for optimized integration times such that accurate distance data can be collected rapidly, in real-time or near real-time for example.

Other aspects, features and advantages will be readily apparent from the following detailed description, the accompanying drawings, and the claims.

DETAILED DESCRIPTION

Figure 1:
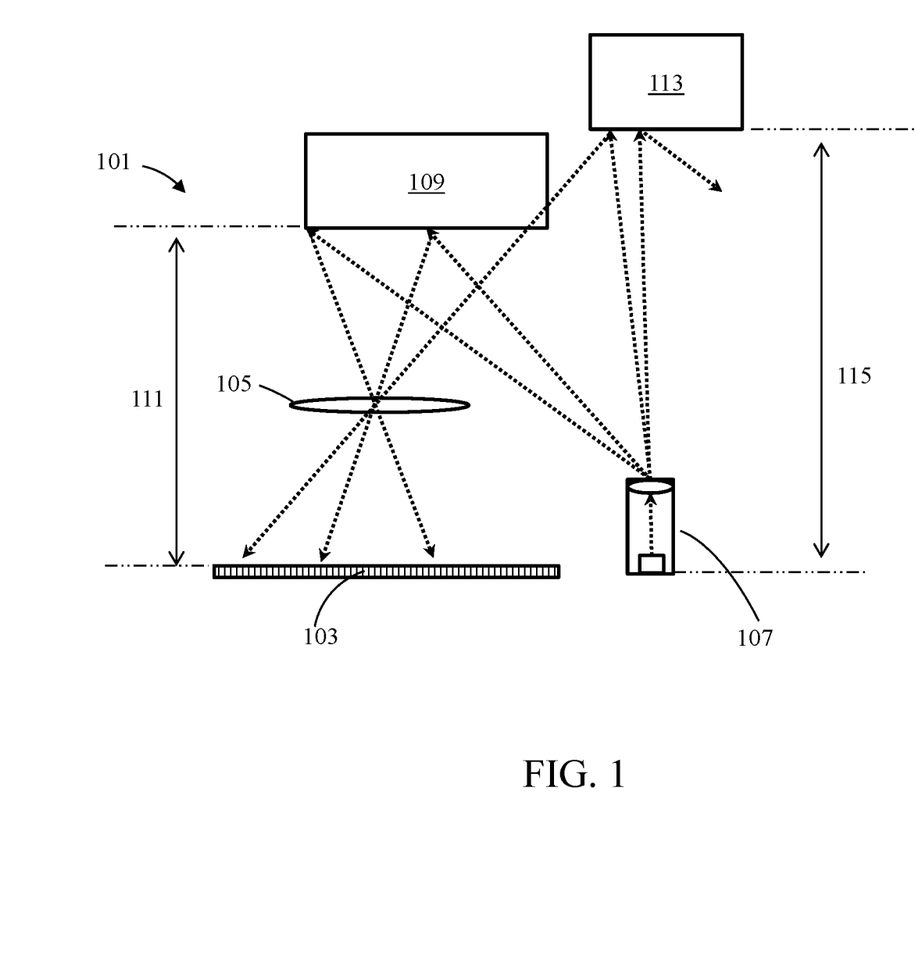
FIG. 1 depicts an example of an optical ranging system operable to generate distance data.

FIG. 1 depicts an example of an optical ranging system 101 operable to generate distance data. The optical ranging system 101 includes a multitude of pixels 103. The pixels can be operable to collect incident light and generate distance data via the time-of-flight technique, for example. The optical ranging system 101 further includes an optical assembly 105 and an illumination module 107. The illumination module 107 can direct light onto one or more objects in a scene at a distance from the optical ranging system 101. For example, light can be directed onto an object 109 at a distance 111 and a second object 113 at a distance 115, for example, as illustrated in FIG. 1. A portion of the light directed from the illumination module 107 is reflected from the objects 109, 113 to the array of 3D pixels 103. In some instances, the illumination module 107 can generate modulated light. Light incident on the pixels 103 can be converted into distance data. However, light incident on some of the pixels can be too intense, not intense enough, or sufficiently intense such that the pixels are correspondingly over-exposed, under-exposed, or adequately exposed, as described above. Consequently, in order to generate accurate distance data in real-time or near real-time, the integration time of the pixels, and the sensitivity and amplification of each pixel can be optimized according to the methods illustrated in FIG. 2-FIG. 7.

Figure 2:
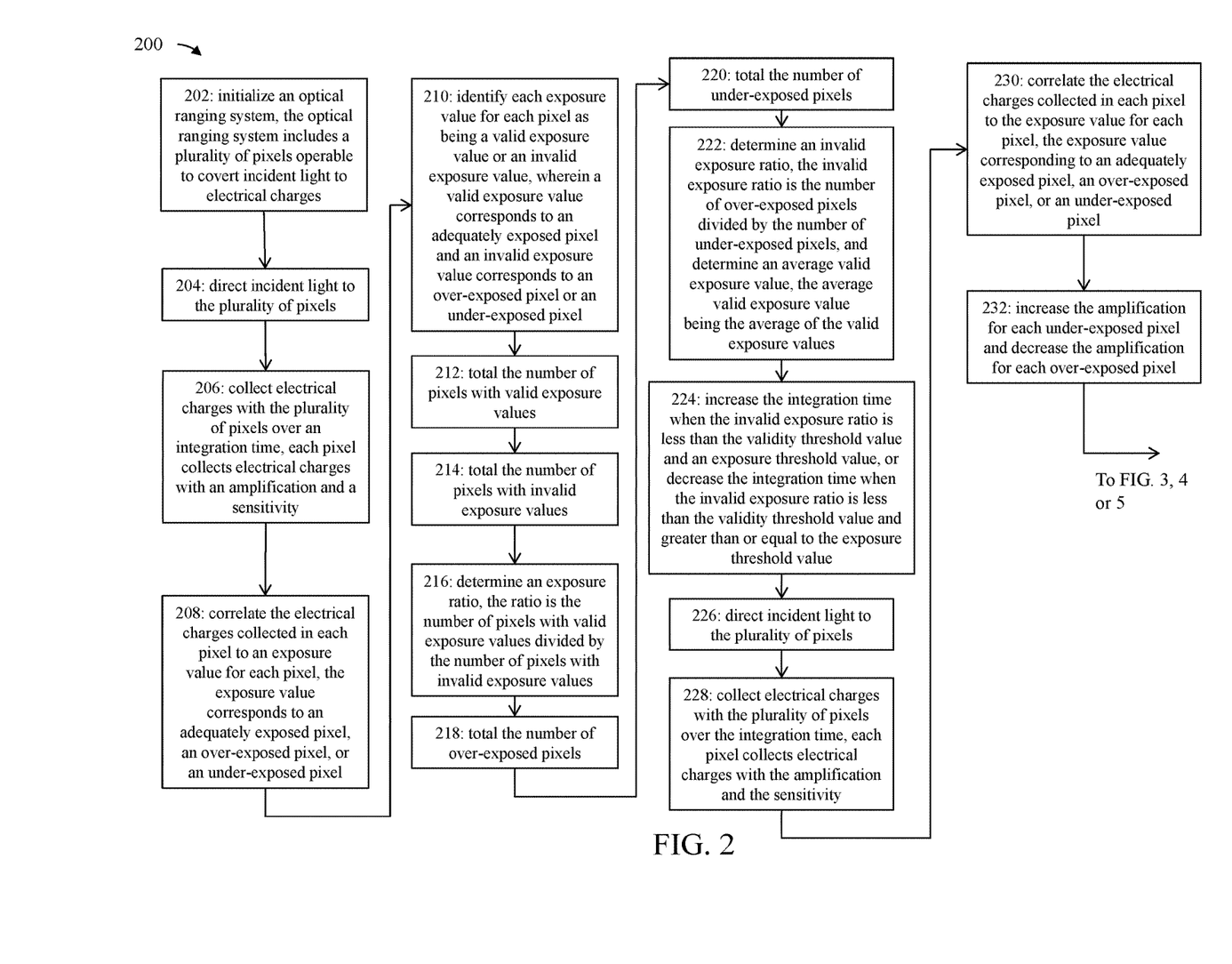
FIG. 2 is a flow chart illustrating a group of operations for executing example methods for generating distance data.

FIG. 2 is a flow chart illustrating a group of operations 200 for executing example methods for generating distance data. In 202, the optical ranging system 100 is initialized, wherein the optical ranging system and its components are prepared to collect distance data. In some instances, the pixels are prepared for a measurement by being reset; for example, charge carriers can be drained out of each pixel. In 204, incident light is directed to the plurality of pixels 103 from the illumination module 107. In 206, electrical charges are collected with the plurality of pixels over an integration time. Further, electrical charges are collected by each pixel with an amplification and a sensitivity. The integration time, the sensitivity, and the amplification may be preset.

In 208, the electrical charges collected in each pixel are correlated to an exposure value for each pixel and saved. The exposure value can be an intensity value within a range of 0-100 arbitrary units (AU), for example. Each exposure value can correspond to an adequately exposed pixel (e.g., 50-70 AU), an over-exposed pixel (e.g., 71-100 AU), or an under-exposed pixel (e.g., 0-49 AU). In 210, each exposure value for each pixel is identified and saved as being a valid exposure value or an invalid exposure value. In this operation, a valid exposure value corresponds to an adequately exposed pixel (e.g., 50-70 AU), and an invalid exposure value corresponds to an over-exposed pixel (e.g., 71-100 AU) or an under-exposed pixel (e.g., 0-49 AU).

In 212, the number of pixels with valid exposure values is totaled and saved. In 214, the number of pixels with invalid exposure values is totaled and saved. In 216, an exposure ratio is determined and saved. The exposure ratio is the number of pixels with valid exposure values divided by the number of pixels with invalid exposure values. For example, the number of pixels with valid exposure values to the number of pixels with invalid exposure values could total 2:1; that is, most pixels in this example would have valid exposure values. In another example, the number of pixels with valid exposure values to the number of pixels with invalid exposures values could total 1:2; that is, most pixels in this example would have invalid exposure values. Such an exposure ratio could indicate too much light or too little light is incident on most pixels within the plurality of pixels 103.

In 218, the number of over-exposed pixels is totaled and saved. In 220, the number of under-exposed pixels is totaled and saved. In 222, an invalid exposure ratio is determined and saved. The invalid exposure ratio is the number of over-exposed pixels divided by the number of under-exposed pixels. For example, the number of over-exposed pixels to the number of under-exposed pixels could equal 2:1; that is, most pixels in this example would be over-exposed. Such an invalid exposure ratio could indicate that too much light is incident on most pixels within the plurality of pixels 103. Operation 222 further includes determining an average valid exposure value. The average valid exposure value being the average of the valid exposure values.

In 224, the integration time is increased and saved when the invalid exposure ratio is less than the validity threshold value and an exposure threshold value, or the integration time is decreased and saved when the invalid exposure ratio is less than the validity threshold value and greater than or equal to the exposure threshold value. The validity threshold value can be 10:1, for example. In such an example, many pixels are valid (i.e., adequately exposed). The optimal validity threshold value can be customized by an end user of the optical ranging system 101, and may be customized for particular applications or response times.

In some instances, the exposure threshold value could be equal to unity. In such instances, when the invalid exposure ratio is 1:1 or greater (e.g., 2:1), indicating more pixels are over-exposed than under-exposed, the integration time would be decreased. Conversely, in such instances, when the invalid exposure ratio is less that 1:1, indicating more pixels are under-exposed than over-exposed, the integration time would be increased. The optimal exposure threshold value can be customized by an end user of the optical ranging system 101, and may be customized for particular applications or response times.

In 226, light is directed onto the pixels, as described above. In 228, electrical charges are collected with the pixels over the integration time determined in 224. Each pixel collects electrical charges with the amplification and the sensitivity as in 206. In 230, the electrical charges collected in each pixel are correlated to the exposure value for each pixel and saved, as described above. The exposure value corresponds to an adequately exposed pixel, an over-exposed pixel, or an under-exposed pixel. In 232, the amplification for each under-exposed pixel is increased and saved, and the amplification for each over-exposed pixel is decreased and saved. The method can proceed according to any of the group of operations illustrated in FIG. 3, 4 or 5 and described in greater detail below.

Figure 3:
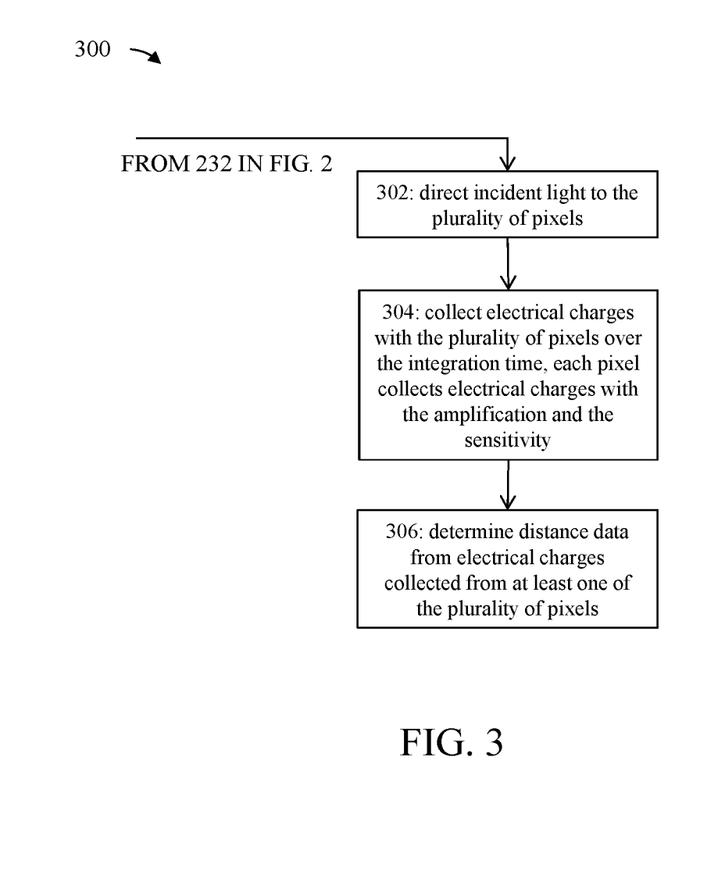
FIG. 3 is a flow chart illustrating a group of operations, in addition to the group of operations illustrated in FIG. 2, for generating distance data.

FIG. 3 is a flow chart illustrating a group of operations 300 for executing example methods for generating distance data. In 302, incident light is directed to the pixels, as described above. In 304, electrical charges are collected by the pixels over the integration time. The integration time can be preset or can be the integration time determined in 224, for example. Moreover, each pixel collects electrical charges with the amplification (e.g., as determined in 232), and the sensitivity. In 306, distance data is determined from electrical charges collected from at least one of the pixels. The distance data can be determined by the direct or indirect time-of-flight technique, for example.

Figure 4:
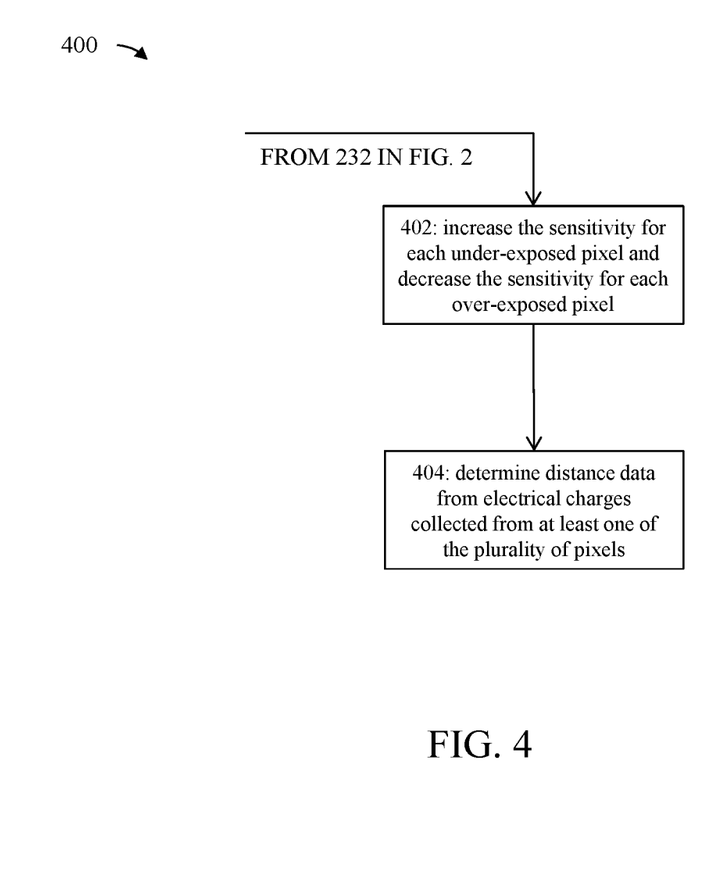
FIG. 4 is a flow chart illustrating another group of operations, in addition to the group of operations illustrated in FIG. 2, for generating distance data.

FIG. 4 is a flow chart illustrating a group of operations 400 for executing example methods for generating distance data. In 402, the sensitivity for each under-exposed pixel is increased, and the sensitivity for each over-exposed pixel is decreased. In some instances, for example, in some pixels operable to demodulate modulated light, the sensitivity of each pixel can be increased or decreased by altering a drift field within each pixel. In 404, distance data is determined from electrical charges collected from at least one of the plurality of pixels. The distance data can be determined by the direct or indirect time-of-flight technique, for example.

Figure 5:
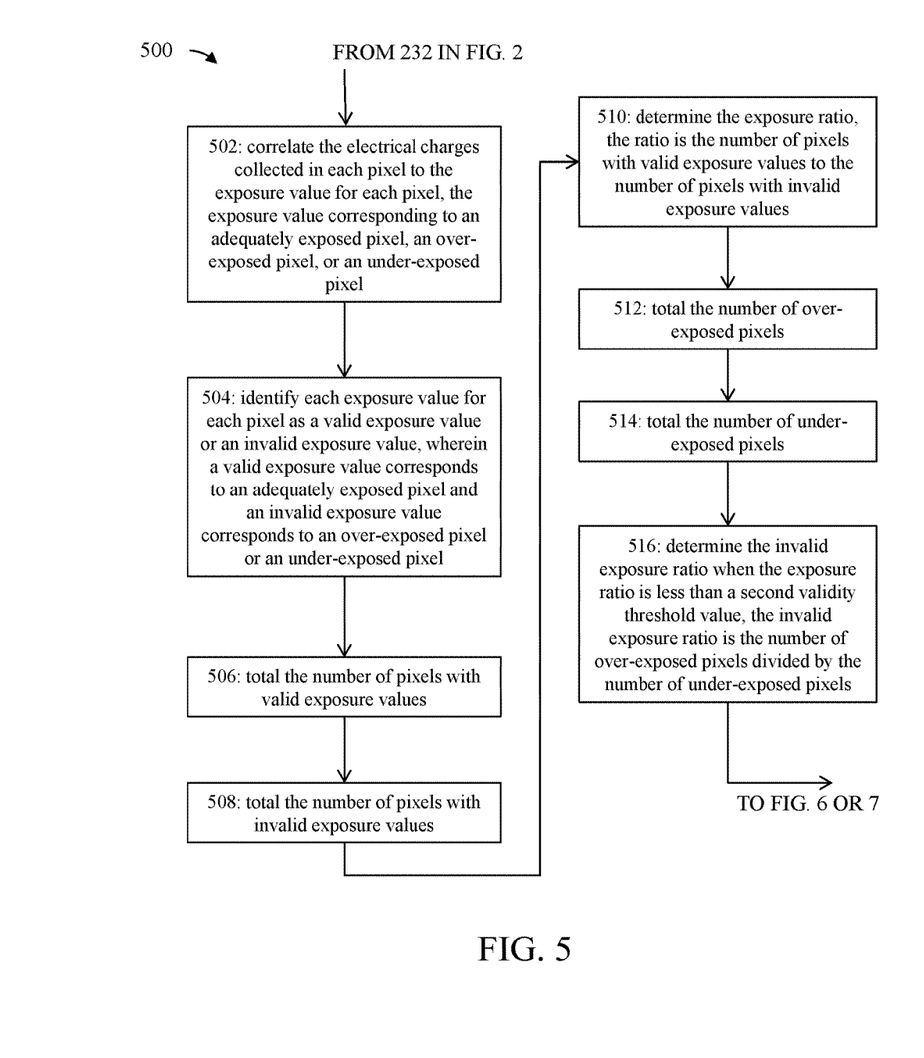
FIG. 5 is a flow chart illustrating still another group of operations in addition to the group of operations illustrated in FIG. 2.

FIG. 5 is a flow chart illustrating a group of operations 500 for executing example methods for generating distance data. Light is directed to the pixels 103, wherein the pixel can collect electrical charges with the integration time, amplification, and sensitivity, as described above. In 502, the electrical charges collected in each pixel are correlated to the exposure value for each pixel. The exposure value corresponds to an adequately exposed pixel, an over-exposed pixel, or an under-exposed pixel, as described above. In 504, each exposure value for each pixel is identified as a valid exposure value or an invalid exposure value and saved. As above, a valid exposure value corresponds to an adequately exposed pixel, and an invalid exposure value corresponds to an over-exposed pixel or an under-exposed pixel.

In 506, the number of pixels with valid exposure values is totaled and saved. In 508, the number of pixels with invalid exposure values is totaled and saved. In 510, the exposure ratio is determined and saved. The ratio is the number of pixels with valid exposure values to the number of pixels with invalid exposure values. In 512, the number of over-exposed pixels is totaled and saved. In 514, the number of under-exposed pixels is totaled and saved. In 516, the invalid exposure ratio is determined when the exposure ratio is less than a second validity threshold value. As above, the invalid exposure ratio is the number of over-exposed pixels divided by the number of under-exposed pixels. The second validity threshold value can be 5:1, for example. In some instances, the validity threshold (e.g., 10:1) can be greater than the second validity threshold (e.g., 5:1). In which case, the second validity threshold can be a lower bar toward proceeding with subsequent operations. In some instances, this feature can decrease the time needed for generating distance data as this operation can take, for example, from 20 microseconds to 6500 microseconds. Moreover, the optimal second validity threshold value can be customized by an end user of the optical ranging system 101, and may be customized for particular applications or response times. The method can proceed according to any of the group of operations illustrated in FIG. 6 or 7 and described in greater detail below.

Figure 6:
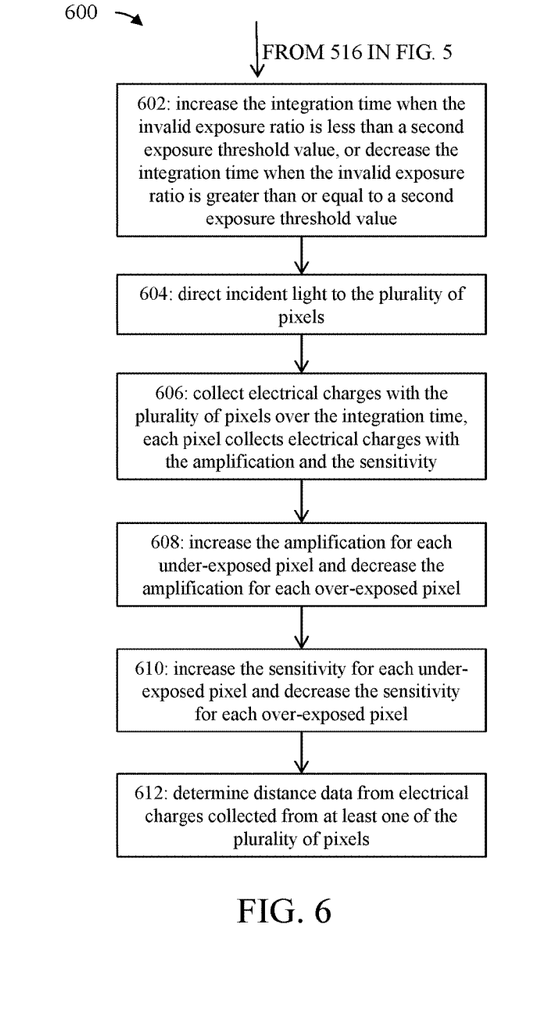
FIG. 6 is a flow chart illustrating a group of operations, in addition to the group of operations illustrated in FIG. 5, for generating distance data.

FIG. 6 is a flow chart illustrating a group of operations for executing example methods for generating distance data. In 602, the integration time is increased when the invalid exposure ratio is less than a second exposure threshold value, or the integration time can decrease when the invalid exposure ratio is greater than or equal to a second exposure threshold value. In some instance, for example, the second exposure threshold value could be equal to unity, but need not be. In some instances, the second exposure threshold value could be equal to the first exposure threshold value, but need not be. The optimal second exposure threshold value can be customized by an end user of the optical ranging system 101, and may be customized for particular applications or response times.

In 604, incident light is directed to the pixels as described above. In 606, electrical charges are collected by the pixels over the integration time. Further, each pixel collects electrical charges with the amplification and the sensitivity as determined in any of several previous operations described above. In 608, the amplification is increased for each under-exposed pixel, and the amplification is decreased for each over-exposed pixel. In 610, the sensitivity for each under-exposed pixel is increased, and the sensitivity for each over-exposed pixel is decreased. In 612, distance data is determined from electrical charges collected from at least one of the plurality of pixels. The distance data can be determined by the direct or indirect time-of-flight technique, for example.

Figure 7:
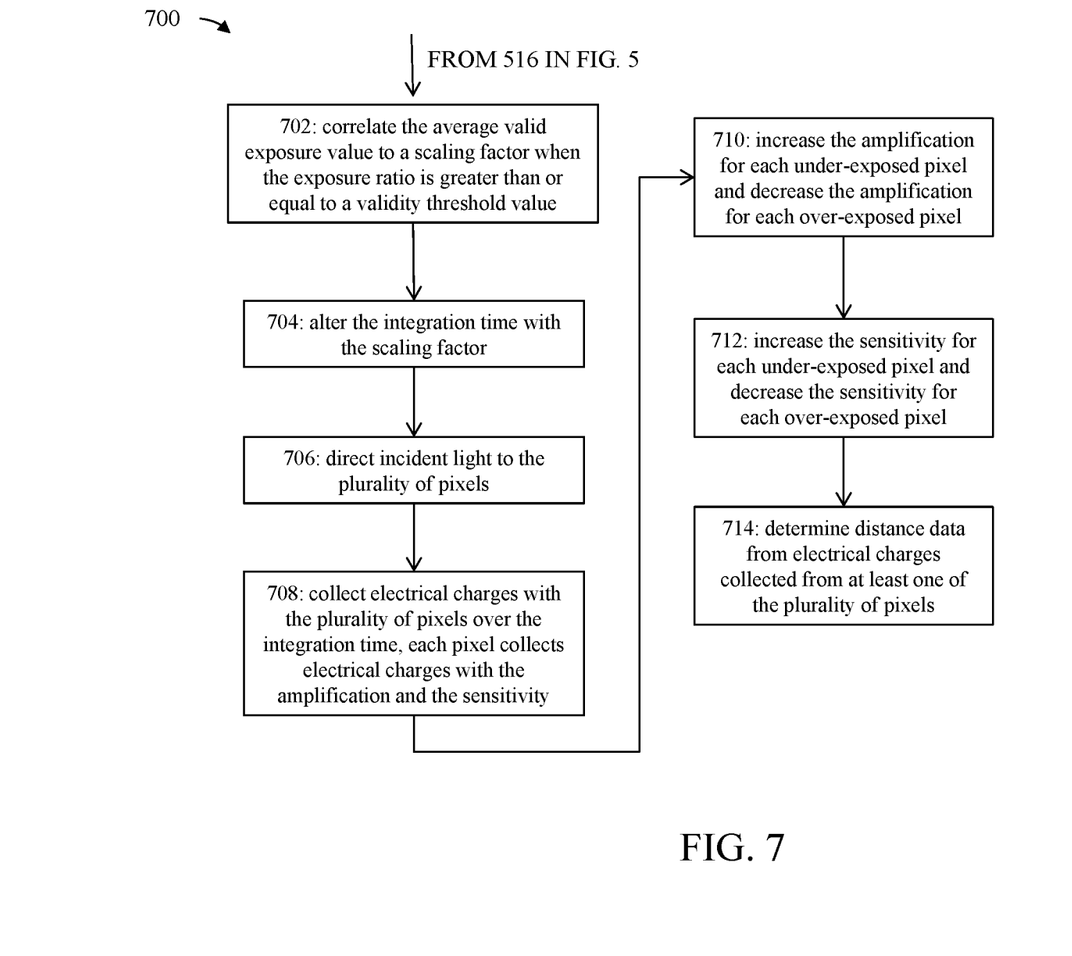
FIG. 7 is a flow chart illustrating a group of operations, in addition to the group of operations illustrated in FIG. 5, for generating distance data.

FIG. 7 is a flow chart illustrating a group of operations 700 for executing example methods for generating distance data. In 702, the average valid exposure value, determined and saved above, is correlated to a scaling factor when the exposure ratio is greater than or equal to a validity threshold value. As described above, the average valid exposure value is the average of the pixels having exposure values within the adequate exposure range (e.g., 50-70 AU). The average valid exposure may be 56 AU, for example. Since, the signal-to-noise ratio increased for increasing exposure values within the adequate exposure range, a higher average valid exposure can correspond to a higher signal-to-noise ratio. Accordingly, the average valid exposure value, of say 56 AU, can correspond to a scaling factor. In 704, the integration time is altered with the scaling factor and saved. For example, an average valid exposure of 56 AU may correspond to a scaling factor operable to double the integration time such that the new integration time produces a new average valid exposure of 70 AU, for example.

In 706, incident light is directed to the pixels, as described above. In 708, electrical charges are collected with the plurality of pixels over the integration time as determined in 704. Further, each pixel collects electrical charges with the amplification and the sensitivity as in any of several operations described previously. In 710, the amplification for each under-exposed pixel is increased, and the amplification for each over-exposed pixel is decreased, as described previously. In 712, the sensitivity for each under-exposed pixel is increased, and the sensitivity for each over-exposed pixel is decreased, as described previously. In 714, distance data is determined from electrical charges collected from at least one of the plurality of pixels. The distance data can be determined by the direct or indirect time-of-flight technique, for example.

The aforementioned examples and implementations describe and illustrate a series of operations in an example method for generating distance data with an optical ranging system. Various operations are described as occurring sequentially. For example, incident light is directed onto one or more objects, light is collected with an integration time, a new integration time is determined, light is directed onto the one or more objects again, and light is collected with the newly determined integration time. The operations need not occur sequentially, however. Such operations can occur simultaneously or near simultaneously (e.g., in parallel). For, example, in some instance while the aforementioned operations are executed light may be continuously directed onto the one or more objects in the scene as other operations are simultaneously execute. Moreover, while the operations have been described in a particular order, they need not occur in that particular order.

Further, the exposure value can be a readout value taken over an arbitrary integration time, for example. Accordingly, other variables and components described as being exposed or having an exposure value, for example, would be understood by a person of ordinary skill in the art to correspond to that arbitrary integration time. For example, the average valid exposure value can be an average readout value of valid pixels. Further, in some cases the exposure value may correspond to an intensity or power value. In all such scenarios, however, the exposure corresponds to a quantity correlated to the photo-generated charge carriers.

Further, the optical ranging system describe above can include other components necessary to implement the example methods described above. For example, the optical ranging system can include power sources, processors, circuitry, drivers, firmware, software, bandpass filters, and so on as would be apparent to a person of ordinary skill in the art to which this disclosure pertains. Other modifications may be made to the foregoing implementations, and features described above in different implementations may be combined in the same implementations. Thus, other implementations are within the scope of the claims.

What is claimed is:

1. A distance acquisition method comprising:
   initializing an optical ranging system, the optical ranging system including a plurality of pixels operable to covert incident light to electrical charges;
   directing incident light to the plurality of pixels;
   collecting electrical charges with the plurality of pixels over an integration time, each pixel collecting electrical charges with an amplification and a sensitivity;
   correlating the electrical charges collected in each pixel to an exposure value for each pixel, the exposure value corresponding to an adequately exposed pixel, an over-exposed pixel, or an under-exposed pixel;
   identifying each exposure value for each pixel as being a valid exposure value or an invalid exposure value, wherein a valid exposure value corresponds to an adequately exposed pixel and an invalid exposure value corresponds to an over-exposed pixel or an under-exposed pixel;
   totaling the number of pixels with valid exposure values;
   totaling the number of pixels with invalid exposure values;
   determining an exposure ratio, the ratio being the number of pixels with valid exposure values divided by the number of pixels with invalid exposure values;
   totaling the number of over-exposed pixels;
   totaling the number of under-exposed pixels;
   determining an invalid exposure ratio, the invalid exposure ratio being the number of over-exposed pixels divided by the number of under-exposed pixels; and
   determining an average valid exposure value, the average valid exposure value being the average of the valid exposure values.

2. The method of claim 1 further comprising increasing the integration time when the invalid exposure ratio is less than the validity threshold value and an exposure threshold value, or decreasing the integration time when the invalid exposure ratio is less than the validity threshold value and greater than or equal to the exposure threshold value.

3. The method of claim 1 further comprising:
   correlating the average valid exposure value to a scaling factor when the exposure ratio is greater than or equal to a validity threshold value; and
   altering the integration time with the scaling factor.

4. The method as in claim 2 or 3, further comprising:
   directing incident light to the plurality of pixels;
   collecting electrical charges with the plurality of pixels over the integration time, each pixel collecting electrical charges with the amplification and the sensitivity;
   correlating the electrical charges collected in each pixel to the exposure
   value for each pixel, the exposure value corresponding to an adequately exposed pixel, an over-exposed pixel, or an under-exposed pixel; and
   increasing the amplification for each under-exposed pixel and decreasing the amplification for each over-exposed pixel.

5. The method as in claim 2 or 3, further comprising:
   directing incident light to the plurality of pixels;
   collecting electrical charges with the plurality of pixels over the integration time, each pixel collecting electrical charges with the amplification and the sensitivity;
   correlating the electrical charges collected in each pixel to the exposure
   value for each pixel, the exposure value corresponding to an adequately exposed pixel, an over-exposed pixel, or an under-exposed pixel; and
   increasing the sensitivity for each under-exposed pixel and decreasing the sensitivity for each over-exposed pixel.

6. The method of claim 4 further comprising:
   directing incident light to the plurality of pixels;
       collecting electrical charges with the plurality of pixels over the integration time, each pixel collecting electrical charges with the amplification and the sensitivity; and
       determining distance data from electrical charges collected from at least one of the plurality of pixels.

7. The method of claim 5 further comprising:
   directing incident light to the plurality of pixels;
   collecting electrical charges with the plurality of pixels over the integration time, each pixel collecting electrical charges with the amplification and the sensitivity; and
   determining distance data from electrical charges collected from at least one of the plurality of pixels.

8. The method of claim 4 further comprising:
   increasing the sensitivity for each under-exposed pixel and decreasing the sensitivity for each over-exposed pixel; and
   determining distance data from electrical charges collected from at least one of the plurality of pixels.

9. The method of claim 4 further comprising:
   correlating the electrical charges collected in each pixel to the exposure value for each pixel, the exposure value corresponding to an adequately exposed pixel, an over-exposed pixel, or an under-exposed pixel;
   identifying each exposure value for each pixel as being a valid exposure value or an invalid exposure value, wherein a valid exposure value corresponds to an adequately exposed pixel and an invalid exposure value corresponds to an over-exposed pixel or an under-exposed pixel;
   totaling the number of pixels with valid exposure values;
   totaling the number of pixels with invalid exposure values;
   determining the exposure ratio, the ratio being the number of pixels with valid exposure values to the number of pixels with invalid exposure values;
   totaling the number of over-exposed pixels;
   totaling the number of under-exposed pixels; and
   determining the invalid exposure ratio when the exposure ratio is less than a second validity threshold value, the invalid exposure ratio being the number of over-exposed pixels divided by the number of under-exposed pixels.

10. The method of claim 9 further comprising increasing the integration time when the invalid exposure ratio is less than a second exposure threshold value, or decreasing the integration time when the invalid exposure ratio is greater than or equal to a second exposure threshold value.

11. The method of claim 9 further comprising:
determining an average valid exposure value when the exposure ratio is greater than or equal to the second validity threshold value, correlating the average valid exposure value to a scaling factor; and
altering the integration time with the scaling factor.

12. The method of claim 10 further comprising:
directing incident light to the plurality of pixels;
collecting electrical charges with the plurality of pixels over the integration time, each pixel collecting electrical charges with the amplification and the sensitivity;
increasing the amplification for each under-exposed pixel and
decreasing the amplification for each over-exposed pixel;
increasing the sensitivity for each under-exposed pixel and
decreasing the sensitivity for each over-exposed pixel; and
determining distance data from electrical charges collected from at least one of the plurality of pixels.

13. The method of claim 10 further comprising:
directing incident light to the plurality of pixels;
collecting electrical charges with the plurality of pixels over the integration time, each pixel collecting electrical charges with the amplification and the sensitivity;
increasing the amplification for each under-exposed pixel and decreasing the amplification for each over-exposed pixel;
increasing the sensitivity for each under-exposed pixel and decreasing the sensitivity for each over-exposed pixel; and
determining distance data from electrical charges collected from at least one of the plurality of pixels.

14. The method of claim 11 further comprising:
directing incident light to the plurality of pixels;
collecting electrical charges with the plurality of pixels over the integration time, each pixel collecting electrical charges with the amplification and the sensitivity;
increasing the amplification for each under-exposed pixel and decreasing the amplification for each over-exposed pixel;
increasing the sensitivity for each under-exposed pixel and decreasing the sensitivity for each over-exposed pixel; and
determining distance data from electrical charges collected from at least one of the plurality of pixels.

15. The method of claim 5 further comprising:
correlating the electrical charges collected in each pixel to the exposure
value for each pixel, the exposure value corresponding to an adequately exposed pixel, an over-exposed pixel, or an under-exposed pixel;
identifying each exposure value for each pixel as being a valid exposure value or an invalid exposure value, wherein a valid exposure value corresponds to an adequately exposed pixel and an invalid exposure value corresponds to an over-exposed pixel or an under-exposed pixel;
totaling the number of pixels with valid exposure values;
totaling the number of pixels with invalid exposure values;
determining the exposure ratio, the ratio being the number of pixels with valid exposure values to the number of pixels with invalid exposure values;
totaling the number of over-exposed pixels;
totaling the number of under-exposed pixels; and
determining the invalid exposure ratio when the exposure ratio is less than a second validity threshold value, the invalid exposure ratio being the number of over-exposed pixels divided by the number of under-exposed pixels.

16. The method of claim 15 further comprising increasing the integration time when the invalid exposure ratio is less than a second exposure threshold value, or decreasing the integration time when the invalid exposure ratio is greater than or equal to a second exposure threshold value.

17. The method of claim 15 further comprising:
determining an average valid exposure value when the exposure ratio is greater than or equal to the second validity threshold value, correlating the average valid exposure value to a scaling factor; and
altering the integration time with the scaling factor.

18. The method of claim 15 further comprising:
directing incident light to the plurality of pixels;
collecting electrical charges with the plurality of pixels over the integration time, each pixel collecting electrical charges with the amplification and the sensitivity;
increasing the amplification for each under-exposed pixel and decreasing the amplification for each over-exposed pixel;
increasing the sensitivity for each under-exposed pixel and decreasing the sensitivity for each over-exposed pixel; and
determining distance data from electrical charges collected from at least one of the plurality of pixels.

19. The method of claim 16 further comprising:
directing incident light to the plurality of pixels;
collecting electrical charges with the plurality of pixels over the integration time, each pixel collecting electrical charges with the amplification and the sensitivity;
increasing the amplification for each under-exposed pixel and decreasing the amplification for each over-exposed pixel;
increasing the sensitivity for each under-exposed pixel and decreasing the sensitivity for each over-exposed pixel; and
determining distance data from electrical charges collected from at least one of the plurality of pixels.

* * * * *